Jan. 3, 1967   A. M. BECHTOLD   3,296,052
MEANS AND METHOD FOR POSTFORMING PLASTIC LAMINATED PRODUCTS
Filed Nov. 8, 1962   7 Sheets-Sheet 1

INVENTOR.
ANTHONY M. BECHTOLD
BY
ATTORNEY

INVENTOR.
ANTHONY M. BECHTOLD

Jan. 3, 1967    A. M. BECHTOLD    3,296,052
MEANS AND METHOD FOR POSTFORMING PLASTIC LAMINATED PRODUCTS
Filed Nov. 8, 1962    7 Sheets-Sheet 6

INVENTOR
ANTHONY M. BECHTOLD

BY *Ephraim Dunning II*
ATTORNEY

Jan. 3, 1967      A. M. BECHTOLD      3,296,052
MEANS AND METHOD FOR POSTFORMING PLASTIC LAMINATED PRODUCTS
Filed Nov. 8, 1962      7 Sheets-Sheet 7

INVENTOR
ANTHONY M. BECHTOLD

BY *Ephraim Brumag III*
ATTORNEY

United States Patent Office 3,296,052
Patented Jan. 3, 1967

3,296,052
MEANS AND METHOD FOR POSTFORMING
PLASTIC LAMINATED PRODUCTS
Anthony M. Bechtold, Fort Lauderdale, Fla., assignor to
Bechtold Engineering Company, Fort Lauderdale, Fla.,
a corporation of Florida
Filed Nov. 8, 1962, Ser. No. 240,469
22 Claims. (Cl. 156—202)

This invention relates to an improved method, and an automated machine, for operating upon the free edge portion of a laminate previously applied flatwise to the face of an elongated core having one or both of its longitudinal edges rounded with a desired curve. It is the operations of bending the free edge portion of the plastic laminate around in close conformity to and bonding engagement with the curved edge or edges of such a core that are the major objectives of this invention.

In the ensuing description the term "laminate" will refer to a plastic material, either thermosetting or thermoplastic, which, when applied to the face of a base material, will provide a durable and attractive surface finish therefore. Such a base, hereinafter called a "core," is commonly produced from plywood, or particle wood, the latter being frequently referred to as "chipboard." Hereinafter the term "woodlike" will at times be used to designate generally the nature of the material forming the core. The work to be operated upon by the present machine is such a laminate already assembled with a desired core and extended flatwise over its entire face to which it is permanently bonded with free edge portions of the laminate extending out coplanarly beyond opposite rounded edges of the core. Completion of the desired product requires that, after application of a suitable adhesive to assure subsequent bonding, each free edge portion of the laminate should first be heated, then be bent to conform with the curved adjacent core edge, then be held with a firm continuing pressure thereagainst while bonding takes place, and finally be trimmed off to remove any excess material lapping beyond the core back. By the present method and means herein to be described, these several operations may be performed expeditiously and dependably, and with a minimum of time and expense.

Among other objects of this invention is the provision for adjustability incorporated into the present machine. This is important because the work may vary widely in cross-sectional contour and dimensions, necessitating in each case that the machine be properly adjusted so that the operations of heating, postforming, bonding and trimming may be successfully performed with due regard for the nature of the laminate and core materials used. Since the finished product is designed for many different uses, its cross-sectional form and dimensions may vary widely as, for example, when it is to serve as trim around doors and windows, as baseboards, drain boards, shelves, drawer fronts, cabinet doors, wainscoting, etc. The finished material is commonly furnished in long lengths, say 12', and in widths ranging from perhaps 6 to 42 inches. Also the cross-sectional contours of the finished products may vary somewhat, as by the application of a build-down to the back of the core along one or both edges thereof. Such a product which serves well as a counter top, is illustrated in various figures of the drawings herein. While it is common in all such products for one or both of the longitudinal edges of the material to be rounded, the application of a laminate facing to a core so formed presents special difficulties, particularly because of the wide variations which exist in their cross-sectional contours and dimensions. According to my invention, however, the present machine may be quickly and accurately adjusted from a single central point to operate successfully upon all such work with assurance of durable and dependable results in every case.

Other objects and advantages inherent in this invention will appear from the ensuing detailed description, taken in conjunction with the accompanying drawings in which is illustrated a machine wherein is embodied the present improvements.

In these drawings.

Figure 1:
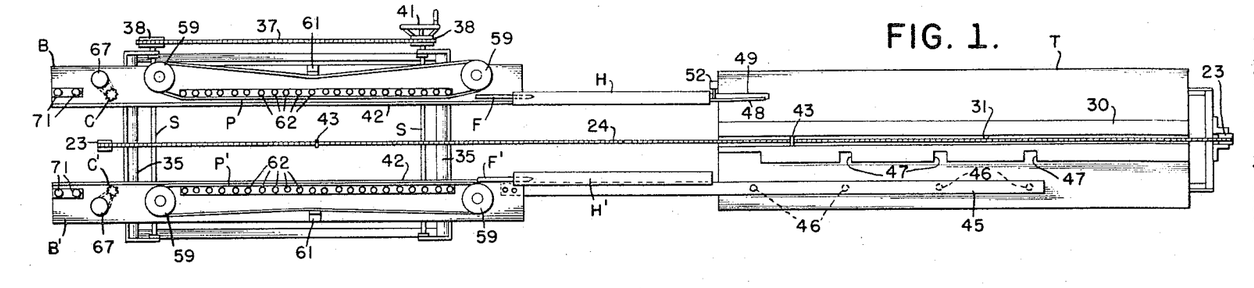
FIGURE 1 is a semi-diagrammatic top plan view of the machine in its entirety, showing the front and rear bases for its operating units adjusted to provide therebetween the requisite space for accommodation of elongated work pieces whch are relatively wide.
Figure 2:
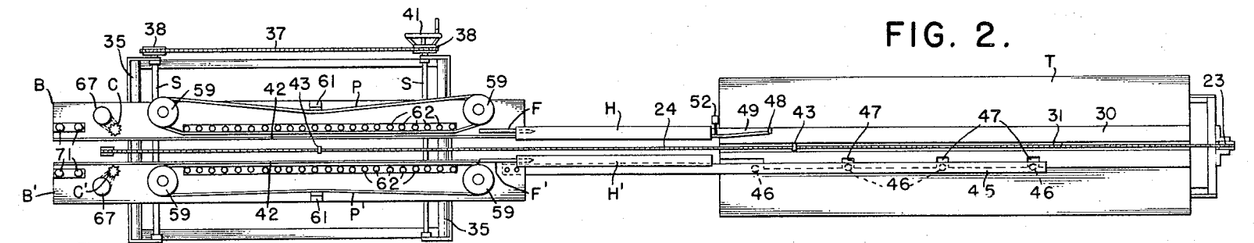
FIG. 2 which is a similar view shows an adjustment of the two bases for accommodation of relatively narrow work.

A general understanding of this invention may best be gained by an initial reference to FIGS. 1 and 2 wherein is shown diagrammatically a plan view of the machine in its entirety. It will be helpful also to refer to FIGS. 3-5 wherein is indicated the cross-sectional profile of the work at different stages during the operations performed thereon. The machine comprises at its receiving end a table top T whereon a limited supply of work W may be placed preliminary to its transfer, piece by piece, to starting position for advance lengthwise of itself through the machine. In this movement it passes successively through zones where the work is subjected to heating, forming, bonding and trimming operations. The means whereby these operations are performed are duplex in that they comprise similar units which are arranged in two rows on opposite sides of the path along which the work is advanced. The support for each set of operating units is a single elongated channeled base extending lengthwise of the machine, one along its front and the other along its rear. The front base is designated as B and the rear base as B', and in the ensuing description similar differentiating reference characters will refer to all like operating units carried on both bases, i.e. with the addition of a prime (') to those characters which identify the operating units on the rear base B'.

The two bases are parallel with capacity for relative movement toward and from each other whereby to vary the width of the elongated space therebetween (see FIGS. 1 and 2, for examples). Within this adjustable space elongated work W, ranging widely in width, may be accommodated and guided in a straight line movement through the successive treating zones of the machine to the point of its discharge therefrom. The work to receive the special treatment that this machine performs comprises in each case an elongated core $c$ with rounded edges $e$, usually a radial curve whose center lies within the cross-sectional confines of the core, or close thereto, together with a laminate $l$ which is permanently affixed flatwise over the core top face and extended out coplanarly beyond its rounded edges. In this preparatory operation, the laminate is first sprayed, or otherwise coated, on its back with an adhesive to a desired coverage, the core face and edges being similarly treated. If the adhesive be a quick-drying contact adhesive that is substantially dried, bonding will readily take place in response to pressure contact. The same is true if the bonding adhesive be of the glue type. It is elongated unfinished work, comprising a laminate applied only to the face of a core, both being conditioned for contact bonding along the core edges, that is the material to be operated upon by the present machine.

Figures 3, 4, 5:
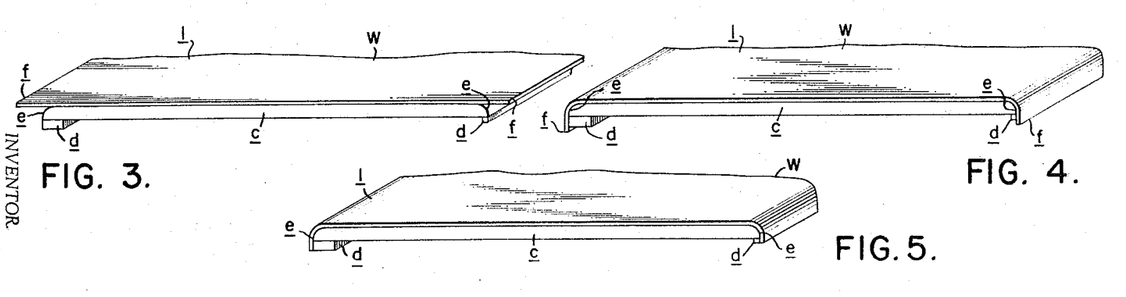
FIG. 3 is a fragmentary perspective view of a piece of work having build-downs affixed to its back along opposite longitudinal edges thereof, the work being equipped with a laminate top facing whose longitudinal free edge portions are extended laterally in coplanar relation, this being its condition when first placed in the machine preparatory to operations by which such free edge portions are heated, bent, bonded to the rounded edges of the core which is comprised in the work, and then trimmed even with the back thereof.
FIG. 4, which is a view similar to FIG. 3, shows the work as it appears immediately after the laminate is bonded to the rounded edges of the core.
FIG. 5, also a view similar to FIG. 3, shows the work all finished with excess material removed from the laminate edges whereby they terminate flush with the core back.
Figure 13:
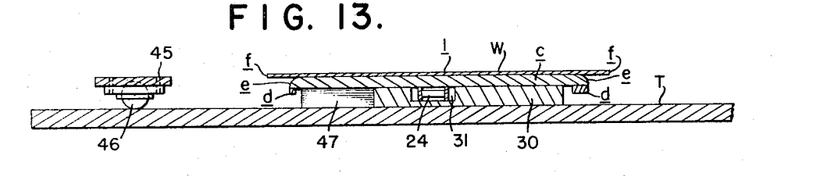
Figure 20:
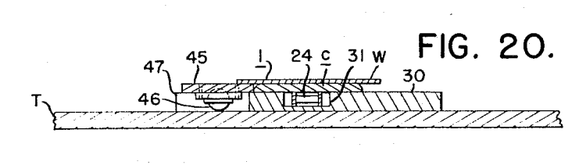
FIG. 20 which is a fragmentary detail view somewhat similar to FIG. 13, shows the fence adjusted to gauging position for a relatively narrow piece of work differing from that elsewhere illustrated in that it is devoid of any build-downs on its back.

Work of this description is positioned on the machine, the laminate facing uppermost with its elongated free edge portions $f$ extended horizontally outwardly and coplanarly beyond the core edges $e$ (FIGS. 3, 13 and 20). In this position it is then advanced continuously through the heating zone between heating units H and H' where these free edge portions are subjected to heat at a temperature and for a time interval sufficient to condition them for flexing and render them amenable to bending; these free edge portions $f$ so flexibilized are then moved past cam-like forming bars F and F' to be subjected thereby to gradually increasing pressures whereby the laminate free edge portions are bent down upon the rounded edges $e$ of the core into close conformity therewith (FIG. 4), any excess of laminate material then being depended below the back of the core; the conformed edge portions $f$ of the laminate are then engaged through a prolonged period by endless bands P and P' which exert a continuing firm and frictionless pressure, directed transversely of the rounded edges of the core to produce a smooth and inseparable bonding of the laminate edge portions to the rounded edges of the core; and, as a final operation, the work is moved past revolving cutters C and C' which trim off, even with the back of the core, any excess of laminate material at that point (FIG. 5). Trimming of excess laminate material is customarily required because of the common practice, when cutting the laminate into strips for application to the elongated core faces, of allowing a little extra for the width so that complete coverage of the core edges may be assured. With this brief description of the product involved and the finishing treatment applied thereto, the operations performed by the machine of this invention, as well as the method practiced in its use, will now be explained in detail.

Figure 10:
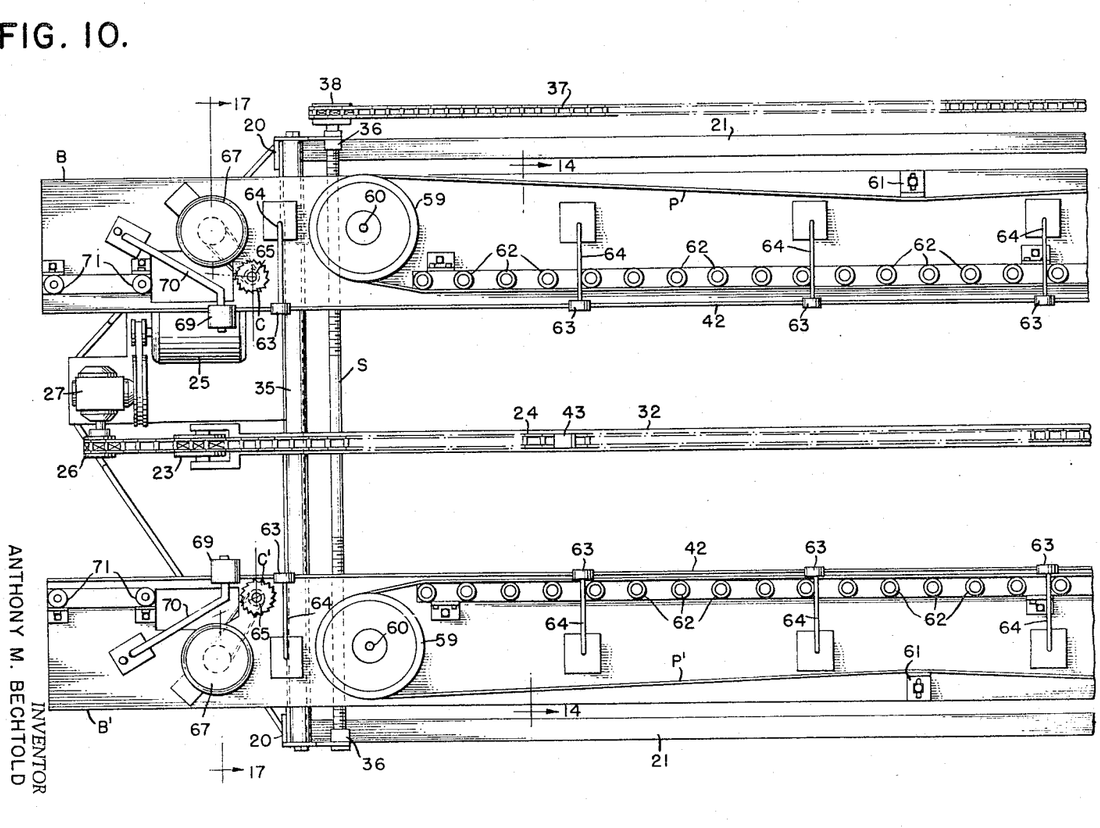
FIG. 10, which is a similar view, shows much of the bonding zone, trimming zone, and the delivery end of the machine.
Figure 16:
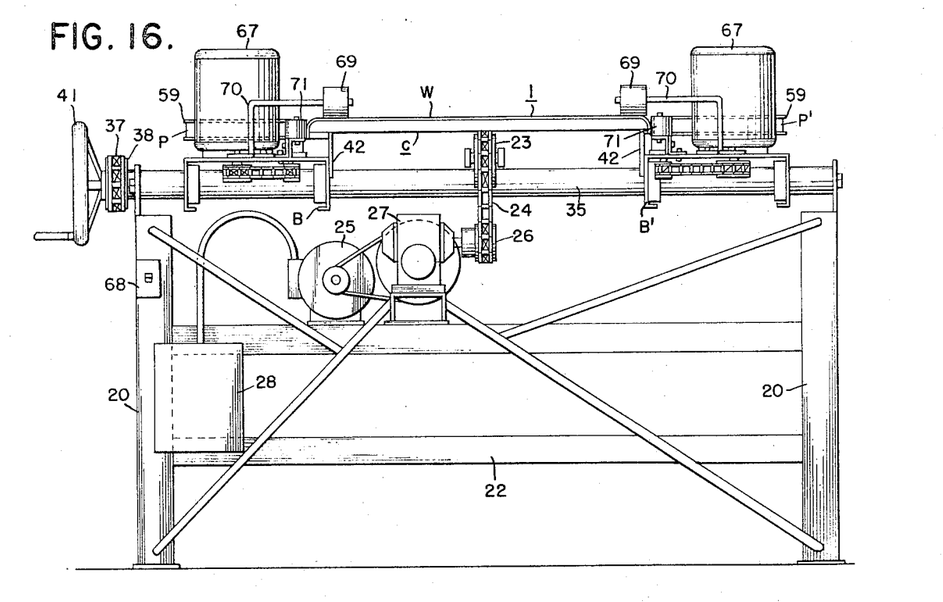
FIG. 16 is an elevational view of the delivery end of the machine.

The machine utilizes an elongated supporting framework which includes interconnected legs 20, longitudinal rails 21 and cross rails 22, all securely joined and braced to provide a strong rigid structure. At the receiving end of the machine where the supporting framework is relatively light the table top T is fixedly mounted. Desirably this is covered with formica or the like to provide a hard and smooth working surface. Each end of the machine framework mounts an idler sprocket wheel 23 (FIGS. 6 and 10) which is freely rotatable about a horizontal axis. An endless feed chain 24 is extended around and between the two idler sprocket wheels with its upper and lower runs disposed in a vertical plane which is substantially coincident with the center line of the machine. A motor 25 fixedly carried on the framework near one of the sprocket wheels 23 is connected thereto through a driving sprocket wheel 26 that is mounted on the shaft of a gear reducer 27 (FIGS. 10 and 16). The feed chain may thereby be continuously moved at a relaively slow speed whenever a controlling switch 28 is closed to complete a circuit (not shown) for the transmission of electrical energy to the motor.

Figure 6:
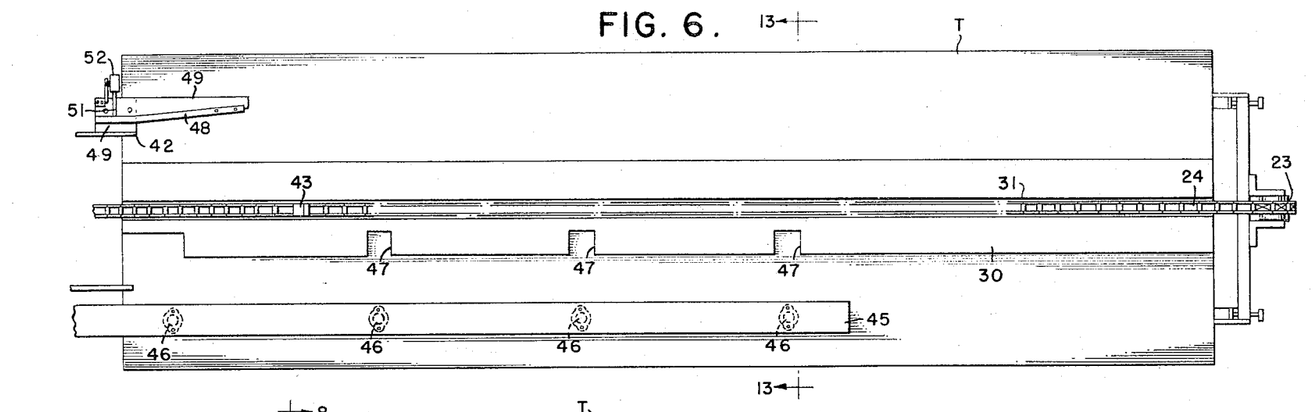
FIG. 6 is a top plan view of the table top at the work-receiving end of the machine.
Figure 7:
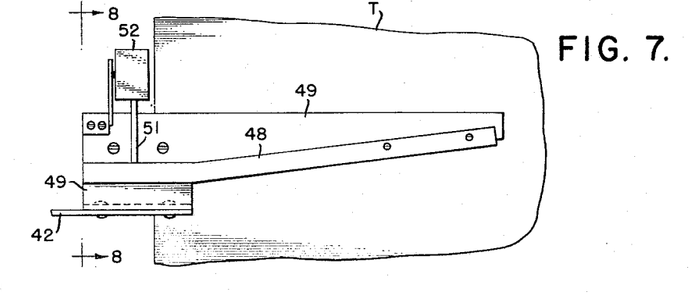
FIG. 7 is a detail in plan of the resilient arm-micro switch assembly along the table front close to its delivery end.
Figure 8:
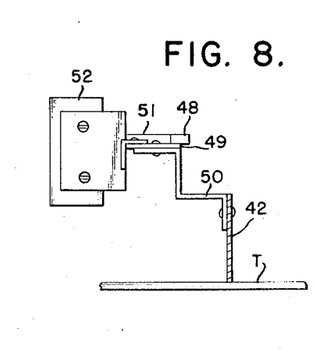
FIG. 8 is a detail in section of the same assembly, taken on line 8—8 of FIG. 7.
Figure 12:
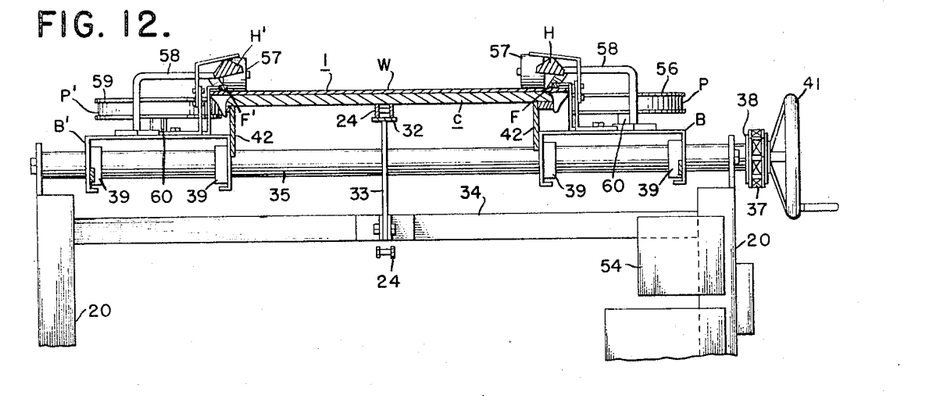
FIGS. 12-15 are transverse sectional views taken, respectively, on line 12—12 of FIG. 9, line 13—13 of FIG. 6, line 14—14 of FIG. 10, and line 15—15 of FIG. 9.
Figure 15:
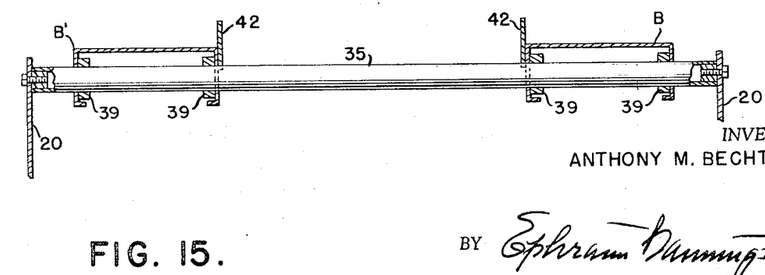
Figure 18:
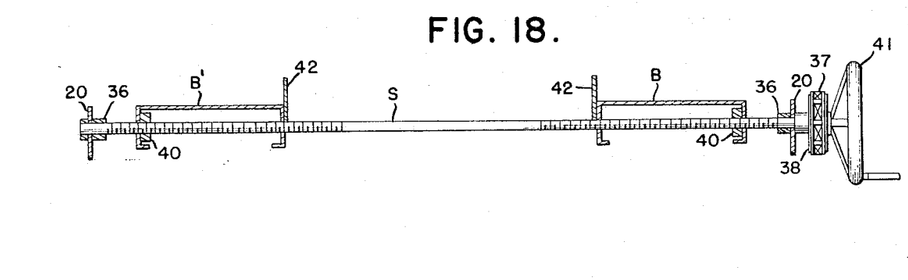
FIG. 18 is a transverse section, taken on line 18—18 of FIG. 9.

The table top T carries a fixedly mounted, relatively narrow, bed 30 extending immediately below the upper run of the feed chain which moves freely through a shallow channel 31 formed therein (FIG. 6). Elsewhere an underlying support whereon the feed chain upper run may freely slide in a level horizontal plane is furnished by an elongated rail 32 extending longitudinally of the machine and carried upon aligned posts 33 upstanding from cross braces 34 which occupy transverse positions between the upper end lower runs of the chain (FIG. 12). Also extending transversely of the machine is a pair of round bars 35 whose opposite ends are fixedly connected to framework rails 21 to be supported thereby. One of these bars is located near the delivery end of the machine and the other relatively close to the table T at the receiving end thereof. A pair of traversing shafts S, one close to each bar 35, is also extended crosswise of the machine for rotation within suitable bearings 36 which are fixedly carried by framework rails 21 (FIGS. 10, 15 and 18). These shafts which are formed with oppositely pitched threads in their two end portions are locked in their bearings against axial movement. As by means of an endless connecting chain 37 extending around and between sprocket wheels 38 mounted fast on the two shafts S, provision is made for their concurrent operation in unison (FIGS. 10 and 18).

The two bars 35 traverse the front and rear elongated channeled bases B and B' to furnish sliding supports therefor, both bases extending longitudinally of the machine between points close to its delivery end and the table at its opposite end. Bearings 39 affixed to side walls of each channeled base interiorly thereof are slidably fitted around each bar 35 to facilitate its free movement thereupon (FIG. 15). Also a threaded collar 40 is affixed interiorly of each channeled base coaxially of each traversing shaft S to coact therewith in response to rotation thereof for shifting the transverse positions of the two bases B and B' oppositely toward and from each other (FIG. 18). These bases remain in parallelism in all adjusted positions, the intervening space varying in width to accommodate the feed chain 24 which remains always in a substantially center position. A hand wheel 41 affixed to the front end of one traversing shaft provides a convenient means for operation of the two shafts S in unison.

The front and rear bases B and B' are similar as to construction, mounting, and uniformity of their opposite movement. They also provide support for the several units (presently to be described) which operate successively upon the work W when the latter is moved longitudinally of the machine centrally thereof. In addition, each base carries upon its side proximate to the feed chain 24 a slide rail 42 whereon the work is rested during its movement through a horizontal path adjacent the upper run of the feed chain 24 (FIGS. 12–15). As by means of a pusher lug 43 upstanding from the upper run of the feed chain a sufficient distance to engage the trailing end of the work, the latter is propelled from a starting position on the table top T to the delivery end of the machine for transfer, manually or otherwise, to a rack or other place of interim storage. Several of these pusher lugs, spaced evenly apart a distance somewhat greater than the length of the longest piece of work to be accommodated within the machine, are operatively carried by the feed chain 24 whereby more than one piece of work may concurrently be advanced through the machine in processional order.

Figures 11, 19:
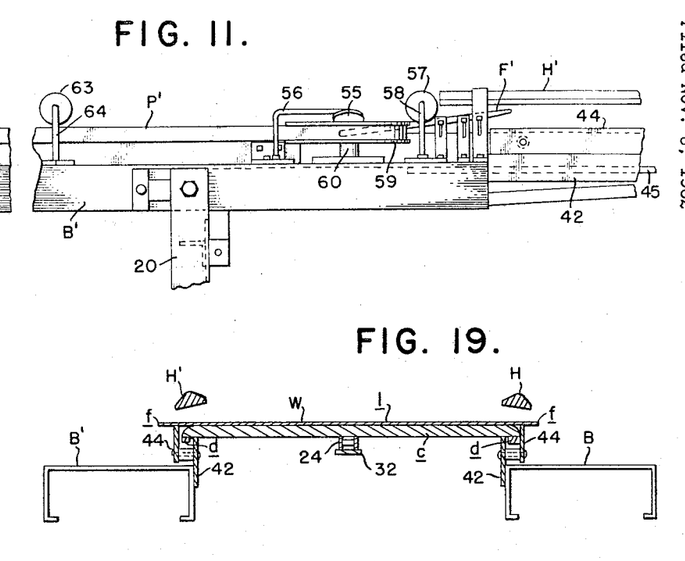
FIG. 11 is a rear elevational view, with portions broken away to confine the showing largely to units at the delivery end of the machine and other units in the bonding and bending zones thereof.
FIG. 19 is a cross sectional view, taken in the same plane as FIG. 12, but looking in the opposite direction.
Figure 14:
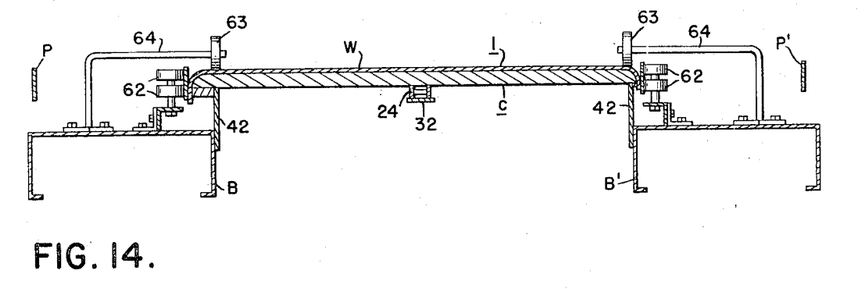
Figure 17:
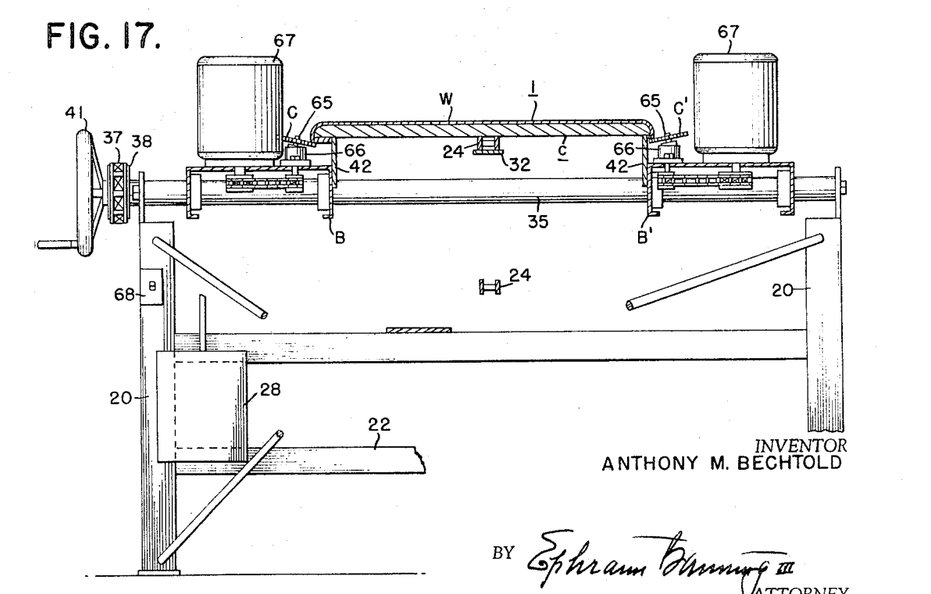
FIG. 17 is a cross sectional view on line 17—17 of FIG. 10.

When the work is operatively positioned on the slide rails 42, the top edges of the latter engage the back of the core at linear points relatively close to its rounded edges e (FIGS. 14 and 17). The outwardly extended free edge portions f of the laminate which extend laterally beyond these rails may thereafter be conformed downwardly during advance of the work through the machine. Any builddown d adjacent a rounded edge of the core on its back is accommodated outwardly of the proximate rail, as shown. Additionally, guide walls 44 are supported as through spaced bolt connections from each rail 42, outwardly thereof, to a height slightly thereabove, these walls being so positioned as to engage the edges e of the core at its point of maximum width (FIG. 19). These walls are extended longitudinally only from a point adjacent the table T as far as the forming bars F and F' beyond which their guiding function is taken over by the endless bands P and P'. When the work is so positioned between the walls 44, its trailing end may be continuously engaged by one of the pusher lugs 43 of the feed chain which then acts to propel the work, while supported upon the slide rails 42, through the machine to the point of delivery therefrom.

The rear base B' is rigidly joined at its end proximate to the table to an elongated fence 45 in the general form of a blade which is extended over the table top T for substantially its full length at a height just sufficient to clear the bed 30 over which it is free to lie when in gauging position relative to narrow work (FIG. 20). This fence may be supported in its elevated position as by ball casters 46 affixed to its under side for rolling engagement with the table top. Several such casters are disposed at spaced intervals lengthwise of the fence, and oppositely of each caster the proximate edge of the bed 30 is inwardly notched at 47 for its accommodation when the fence adjustment so requires, as in FIG. 20 where the work is narrow and devoid of bulid-downs. This is a desirable provision in order that the fence may be adequately supported when adjusted to widely different positions relative to the feed chain 24 in response to like adjustments of the rear base B' to which the fence is rigidly secured.

The fence 45 functions as a gauge against which the work is rested when first placed on the table bed preparatory to its operative advance through the machine. The fence will then underlie one of the free edge portions f of the laminate so as to engage an edge e of the core at a point of its maximum width. When so positioned, the forward end of the work will lie between the fence and a resilient cam arm 48 oppositely of the forward fence end. The cam arm is fixedly secured in its forward end portion upon a base plate 49 which is supported upon a bracket 50 carried by the slide rail 42 on the front base B. This cam arm cooperates with the fence to form a flaring throat through which the work is normally guided while being advanced through the machine. Should the bases B and B' be improperly adjusted relative to the work, the latter, if too wide to pass therethrough, will force the cam arm 48 back, thereby transmitting a like motion to the plunger 51 of a micro switch 52, also carried on the bracket 50, to open the electrical circuit through which the chain motor 25 is energized. In any such event, forward motion of the work will immediately be halted with consequent avoidance of damage to the machine. When the work has advanced past the cam arm 48, it will be received between the two bases B and B' for operative placement upon the slide rails 42 between the guide walls 44.

Figure 9:
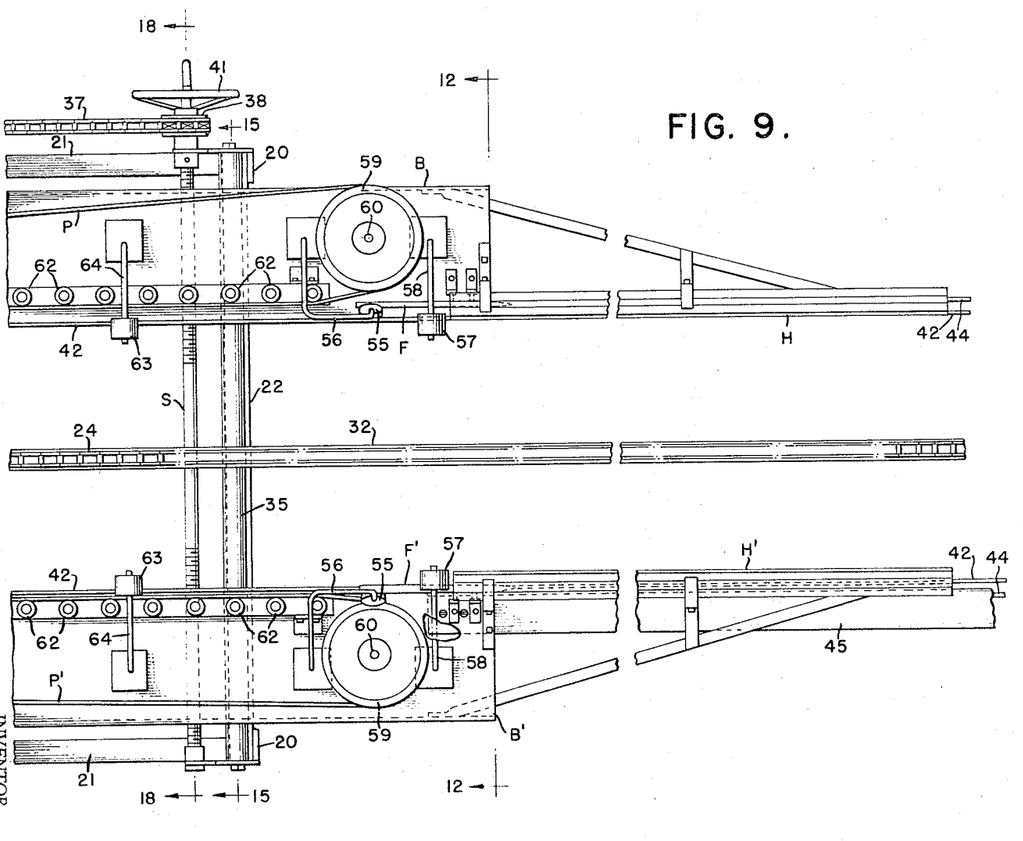
FIG. 9 is a fragmentary top plan view of the machine showing the principal units comprised in its heating, bending, and bonding zones.

At this point the work will stand between the heating units H and H' each comprising an elongated enclosure or reflector carried upon a bracket 53 which is upwardly extended from the proximate base (FIGS. 9 and 12). Satisfactory results may be obtained from infrared heaters with double elements, the enclosures therefor being continuously open lengthwise thereof directly over the proximate free edge portions f of the laminate l on the work during its sliding movement along the rails 42. The free edge portions of the laminate are thereupon subjected to a concentration of heat rays emitted from the two heaters for a time interval which is determined in part by their length, which may be several feet, and in part by the operating continuity of the heaters. The former is affected by the speed of travel of the work past the heaters and the latter by a cycling input controller 54 in circuit with the two heating units H and H' when set to a desired percentage of off and on time whereby to control the heat as best required for the type of laminate comprised in the work W. The heating treatment so applied to the free edge portions f of the laminate is a first stage in the operations performed by the present machine on the work passing therethrough. It produces a flexibilizing of the laminate, confined to its free edge portions f which are thereby rendered amenable to bending—an operation which immediately follows in the next succeeding stage of the work advance.

The two bases B and B' also fixedly mount forming bars F and F' which each stand in the path of a heated free edge portion f of the laminate l at the point of its emergence from the heating zone just described (FIGS. 11 and 12). Each forming bar is supported from the proximate base with a free end extended rearwardly toward the oncoming work and with a slight upward incline so as to ride over the adjacent free edge portion f of its laminate l after the manner of a cam. With continued advance of the work, each forming bar then engages the laminate free edge portion with an increasing pressure to force the latter downwardly and around the proximate curved edge e of the core c into close conformity thereto and engagement therewith. In this bending operation, which is a second stage in the treatment imposed upon the laminate, assistance is furnished by (a) a radius roller 55 carried upon a bracket arm 56 (FIGS. 9 and 11) upstanding from each base and so positioned as to exert on the bent edge portion f of the laminate l a pressure force directed radially toward the curved edge e of the core, and (b) a pair of hold-down idler rollers 57 (FIGS. 9 and 14), each carried upon a bracket arm 58 upstanding from one base and positioned directly above the core so as to engage with the laminate applied thereto at a point immediately inwardly of its proximate rounded edge e. Both the radius and hold-down rollers just noted are positioned close to one of the forming bars and so located as to engage the work substantially within the zone where bending of both free edge portions f of the laminate is performed. These two pairs of rollers apply effective pressures over extended areas transversely of the work along and over the rounded edges of the core then newly covered by the laminate edge portions f, whereby to promote a smooth and inseparable bonding of one to the other.

The third stage of operative treatment to which the work is subjected consists of promptly establishing an effective pressure against each laminate bent edge portion f for the entire length of the work. This is accomplished by a pair of like endless bands P and P' of flexible steel or the like, each looped to extend around and between a pair of flanged idler wheels 59 rotatable upon vertical spindles upstanding from each base and tensioned by adjustable means 61. The inner run of each pressure band is maintained in an unyielding straight line by a plurality of closely-spaced back-up rollers 62 which, as shown, may be arranged in pairs, one above the other, each freely rotatable upon a pintle which upstands from the proximate base (FIGS. 9, 10 and 14). Between the roller-backed inner runs of two such endless bands is a space just sufficient, when the two bases are properly adjusted, for the work to pass therethrough while subjected to opposing pressures therefrom. These pressures are applied evenly to the conformed edge portions $f$ of the laminate $l$, mainly along the lineal point of maximum core width, to maintain the laminate closely and smoothly engaged therewith, and they are applied thereto at every point longitudinally thereof continuously for a period of time sufficient for an effective bonding to take place between the edge portions $f$ of the laminate $l$ and the rounded core edges $e$ over which the laminate is conformed. It will be noted that maintenance of these pressures is established without relative movement between the two bands and the work therebetween since the friction between them suffices to transmit to the bands a movement the same in speed and direction as that of the work itself. To safeguard the work from deviating from its advance in a true and even plane, additional hold-down rollers 63 are carried upon bracket arms 64 upstanding from each base, these rollers being spaced opposite each band in position to engage with the top face of the work close to the opposite longitudinal edges thereof.

Upon emergence of the work from between the pressure bands P and P', one further operation remains to be performed, this being the trimming off of excess laminate material even with the back of the core $c$. To accomplish this end, I provide on the two bases B and B' near the delivery end of the machine, rotary cutters C and C' each mounted fast on a shaft 65 extending upwardly from a gear box 66 to which power is transmitted from a motor 67 (FIGS. 10 and 17). The mounting of each cutter is such that the axis of its driving shaft may be slightly tilted, as desired, to position the top face of its cutting teeth exactly flush with the core back, thereby to assure a trimming off of laminate material in flush relation therewith. In the case of work W where a build-down $d$ is carried on the core back adjacent one or both edges thereof, the laminate should be trimmed flush therewith, and the term "core back" then refers thereto when defining the plane where trimming should be performed. The two motor-trimmer units just described are joined in a common electrical circuit (not shown) connecting them both to a source of electrical energy and to a control switch 68 therefor on the front of the machine (FIG. 17). At this point, where the work emerges from between the two cutters C and C', another pair of hold-down rollers 69, each carried by a supporting bracket 70 which upstands from one of the bases, engages with the work to hold it steady during the final operation of trimming and while its delivery from off the machine proceeds (FIGS. 10 and 11). There is also positioned on each base a pair of spaced apart work-edge-engaging rollers 71 which furnish guidance to the work beyond the trimmers at the delivery end of the machine, to assure an undeviating movement therethrough to the point of delivery therefrom. The several successive operations of heating, bending, bonding, and trimming have all been completed when the work arrives at this point where it is free to be deposited upon a rack or table preparatory to its removal to a place of storage or use.

A successful production machine according to this invention, with a length of about 29 feet, will handle work in lengths up to 12 feet or so. A feed chain speed of from 8 to 10 feet per minute will suffice. The overall spacing of the four operating units on each base need not be more than 12 feet, so when work of this length is advanced through the machine it is potentially subjected to concurrent heating, bending, bonding and trimming operations at spaced points lengthwise thereof. From a limited supply stacked on the table T, an attendant may conveniently place pieces of work, one at a time, on the table bed in operative position to be engaged by the next oncoming pusher lug 43 on the feed chain to be advanced thereby through the machine. Before starting of any operations, the attendant should ascertain the width of the work to be treated and then operate the hand wheel 41 to obtain the proper spacing therefor between the two bases B and B'; he should also set the cycling input controller 54 for off and on time percentages in the operation of the two heaters H and H' in accordance with the requirements of the type of laminate $l$ whose free edge portions $f$ are to be conformed and bonded to the core edges $e$. And finally, when everything is ready, he will close the switches 28 and 68 to start the feed chain 24 and the two motors 67 whereby to operate both trimmers C and C'. The work W then to be propelled by the feed chain will thereafter receive successive treatments from the duplicate sets of four operating units H–H', F–F', P–P' and C–C' whereby to conform and bond opposite edge portions $f$ of the laminate, formerly extended coplanarly beyond the core edges $e$, to the curved surfaces thereof, all as heretofore described in detail.

Protecting hoods which upstand from the outer walls of the two bases B and B' to overlie the several operating units thereupon have been omitted from the drawings in the interest of clarity.

I claim:

1. An elongated postforming machine for operating upon work comprising a laminate applied flatwise over the face of an elongated core having opposite rounded edges beyond which free edge portions of the laminate are extended in a common plane, the core edges and exposed back of the laminate being conditioned for mutual bonding, the machine comprising a supporting framework whereon is mounted front and rear elongated bases disposed in parallel and spaced relation, feeding means for advancing the work lengthwise of itself and of the machine through the space between the two bases, means disposed in successive zones lengthwise of the machine for heating the free edge portions of the laminate to produce a flexibilizing thereof, for bending the flexibilized free edge portions of the laminate down and around the rounded edges of the core into close conformity therewith, and for applying prolonged pressures to the conformed edge portions of the laminate from end to end to produce a bonding thereof to the core edges, the three operating means last named being provided in duplicate, one set carried on each base, and adjusting means in connection with the two bases operable to produce a shifting movement of one base toward and from the other while maintaining their parallel relationship, to position the operating means thereon a predetermined distance from the work regardless of the width thereof.

2. A postforming machine according to claim 1 wherein a table is joined to the machine at its receiving end, and a fence, serving as a gauge for positioning work in line with its intended path of travel through the machine, is connected rigidly to one of the bases to move therewith in response to each adjustment thereof.

3. A postforming machine according to claim 1 wherein the means for advancing the work is an endless chain extended lengthwise within the space intermediately of the bases and arranged between and over sprocket wheels rotatable about horizontal axes, one at each end of the machine, to provide upper and lower runs therefor, a motor is in driving connection with the chain to impart motion thereto, means underlies the top run of the chain in contact therewith to provide a level and even support therefor intermediately of the sprocket wheels, and pusher lugs are carried at spaced intervals on the chain to extend outwardly therefrom in position to engage an end of the work when supported over and between the bases to be advanced lengthwise of the machine.

4. A postforming machine according to claim 1 wherein each base mounts adjacent its inner side a slide rail whereon to slidingly support the work at a point close to one of its longitudinal edges but inwardly thereof whereby the free edge portions of the laminate remain outwardly thereof in position to be operated upon while advancing through the machine.

5. A postforming machine according to claim 1 wherein the heating means is elongated lengthwise of the machine above the opposite free edge portions of the laminate to be flexibilized preparatory to bending, and an enclosure is provided for each heating means with an elongated opening on its under side to permit free emission of heat rays therefrom for concentrated application upon the laminate free edge portions therebelow.

6. A postforming machine according to claim 1 wherein the bending means comprises a stationary cam bar extended toward oncoming work in position to engage one of its flexibilized free edge portions with a progressively increasing pressure to force the same down and around the proximate core edge in conformity therewith.

7. A postforming machine according to claim 6 wherein the bending means comprises also a radius roll, in engagement with the conformed free edge portion of the laminate, exerting pressure thereon directed toward the center of the core edge curve over which the laminate free edge portion is conformed.

8. A postforming machine according to claim 1 wherein the means for applying pressure to the conformed edge portion of the laminate comprises in each case an endless flexible band looped around a pair of widely-spaced idler wheels rotatable about vertical axes to provide therefor inner and outer runs the former of which lies in a vertical plane coincident with a rounded edge of the core at its point of maximum width, and a plurality of closely-spaced back-up idler rollers rotatable about vertical axes are aligned adjacent the inner run of the band to engage the inner face thereof thereby to maintain the band inner run in pressure engagement with the proximate conformed edge portion of the laminate lengthwise thereof continuously during movement of the work between the widely-spaced wheels to promote bonding of the laminate conformed edge portion to the rounded edge of the core.

9. A postforming machine according to claim 1 wherein the means for applying pressure to the conformed edge portion of the laminate comprises in each case a flexible endless band looped around a pair of widely-spaced idler wheels rotatable about vertical axes to provide therefor inner and outer runs the former of which lies in a vertical plane coincident with a rounded edge of the core at its point of maximum width, together with means engaging the inner face of the inner run of the band to maintain it in pressure engagement with the proximate conformed edge portion of the laminate continuously during movement of the work lengthwise thereof, the band also being movable therewith in response to frictional engagement therefrom whereby to avoid relative movement therebetween.

10. A postforming machine according to claim 9 wherein vertical walls adjacent opposite edges of the core extend through the heating zone of the machine to guide the work through a straight path into the space between the inner runs of the endless bands, the latter serving to guide the work for the remainder of its advance through the machine.

11. A postforming machine according to claim 1 wherein the heating means is electrically operated and provided with a cycling input controller therefor, adjustable to a desired percentage of off and on time whereby the heat units delivered to the laminate free edge portions may be varied according to the type of laminate comprised in the work.

12. A postforming machine according to claim 1 wherein duplicate means, operating to trim off excess material remaining along the laminate edges after bonding thereof to the core, are carried by the two bases at points close to the delivery end of the machine.

13. A postforming machine according to claim 12 wherein each means for trimming excess material from the laminate along its bonded edges comprises a rotary toothed cutter operable about a substantially vertical axis with the toothed periphery of the cutter positioned adjacent the path of movement of oncoming work and in position to engage and trim off, flush with the core back, any excess of material depending therebelow.

14. An elongated postforming machine for operating upon the free edge portion of a laminate applied flatwise to the face of an elongated core having a rounded edge beyond which the laminate is extended coplanarly, the said core edge and exposed back of the laminate being conditioned for mutual pressure-bonding, the machine comprising a supporting framework whereon is mounted an elongated base, means for advancing the work lengthwise of itself and of the machine through a straight path adjacent the base and parallel thereto, means for heating the free edge portion of the laminate during initial advance of the work through the machine to flexibilize said free edge portion, means engaging the free edge portion of the laminate promptly after flexibilizing thereof and progressively for its entire length during a second stage of its advance through the machine to uniformly bend the flexibilized free edge portion of the laminate through a curve closely conforming to the rounded edge of the core for uninterrupted engagement therewith for the full length thereof, pressure means engaging the curved edge portion of the laminate continuously from end to end thereof during a third stage of advance of the work to apply thereto a prolonged and sufficient pressure to produce a bonding thereof to the core edge engaged thereby, all of the said means thus operating upon the work being aligned upon the base in spaced relation to each other, and means for adjusting the base to positions toward and from the work to compensate for variations in the width thereof whereby all operations thereon may be confined to the said free edge portion of the laminate thereon.

15. A postforming machine according to claim 14 wherein is provided trimming means, acting on the laminate following the third stage of advance of the work, to sever the laminate at a point flush with the back of the core.

16. A postforming machine according to claim 1 wherein a table is provided at the work-receiving end of the machine, and a fence is extended rigidly from one end of one base to overlie the table at an elevation less than the thickness of the work when the latter is rested on the table, adapted to engage an elongated edge of its core and serve as a positioning gauge therefor when the fence is moved with said base in response to adjustments thereof.

17. A postforming machine according to claim 16 wherein a channeled bed is extended lengthwise of the table with the work-feeding means disposed therein in position to propel work along the bed when the work is placed thereon, and spaced means depend from the fence to engage the table for support of the fence at a predetermined elevation thereabove and above the bed when the fence is positioned thereover in response to adjusting movements of the said base.

18. A postforming machine according to claim 16 wherein a yieldable cam arm is mounted on the table oppositely of the fence and in spaced relation thereto to cooperate therewith in providing converging guides for the work when propelled lengthwise of itself for advance through the machine, electrically operated means is provided for operation of the feeding means, and a switch in circuit with said electrically operated means is movable to open position in response to yielding of the cam arm whenever, through faulty adjustment of the two bases relative to the width of the work to be accommodated in the machine, the passing work imposes an excessive pressure upon the yieldable arm.

19. The method of conforming flat plastic laminates in the form of strips fixedly and permanently applied to the faces of variable-width elongated wood-like cores having parallel opposite edges which are rounded, the transverse peripheral width of each core being somewhat less than that of the applied laminate strip, the method comprising the steps of applying a bonding adhesive to the core edges and to the exposed back of the unbent free edge portions of the laminate, applying heat to the free edge portions of the laminate in an amount and for a time requisite for rendering the said laminate free edge portions amenable to bending, and, while so heated and amenable to bending, applying to the free edge portions of the laminate a bending force, starting at one end of the laminate and moving steadily to the other end thereof, to progressively deflect the free edge portions of the laminate toward and upon the rounded edges of the core and into close conformity therewith, and, promptly after being so conformed, applying to the laminate edge portions opposing pressures exerted over a substantial distance lengthwise of the laminate, starting at one end thereof and continuing to the other through a prolonged interval, to induce bonding to the core edges of the conformed edge portions of the laminate, any excess of laminate material being then disposed beyond and past the back of the core, and trimming off all such excess material evenly with the core back, and controlling application of the heat and of the bending and bonding forces so applied to the laminate edge portions, as required by the width of the particular core to which the laminate is conformed, to assure a continuous and firm adherence of the laminate free edge portions to opposite rounded edges of the core.

20. The method of conforming flat plastic laminates in the form of strips applied fixedly and permanently to the faces of variable-width elongated wood-like cores having parallel opposite edges which are rounded, the transverse peripheral width of each core being somewhat less than that of the applied laminate strip, the method comprising the steps of applying a bonding adhesive to the core edges and to the exposed back of the unbent free edge portions of the laminate, applying heat to the free edge portions of the laminate in an amount and for a time requisite for rendering the said laminate free edge portions amenable to bending, and, while so heated and amenable to bending, applying to the free edge portions of the laminate a bending force to deflect the free edge portions of the laminate toward and upon the rounded edges of the core and into close conformity therewith, and promptly after being so conformed, applying to the laminate edge portions opposing pressures to induce bonding to the core edges of the conformed edge portions of the laminate, and controlling application of the heat and of the bending and bonding forces so applied to the laminate edge portions, as required by the width of the particular core to which the laminate is conformed, to assure a continuous and firm adherence of the laminate free edge portions to opposite rounded edges of the core.

21. The method of conforming flat plastic laminates in the form of strips applied fixedly and permanently to the faces of variable-width elongated wood-like cores having parallel opposite edges which are rounded, the transverse peripheral width of each core being somewhat less than that of the applied laminate strip, the method comprising the steps of applying a bonding adhesive to the core edges and to the exposed back of the unbent free edge portions of the laminate, applying heat to the free edge portions of the laminate in an amount and for a time requisite for rendering the said laminate free edge portions amenable to bending, and, while so heated and amenable to bending, applying to the free edge portions of the laminate a bending force, starting at one end of the laminate and moving steadily to the other end thereof, to progressively deflect the free edge portions of the laminate toward and upon the rounded edges of the core and into close conformity therewith, and, promptly after being so conformed, applying to the laminate edge portions opposing pressures exerted over a substantial distance lengthwise of the laminate, starting at one end thereof and continuing to the other through a prolonged interval, to induce bonding to the core edges of the conformed edge portions of the laminate, and controlling application of the heat and of the bending and bonding forces so applied to the laminate edge portions, as required by the width of the particular core to which the laminate is conformed, to assure a continuous and firm adherence of the laminate free edge portions to opposite rounded edges of the core.

22. The method of conforming a flat plastic laminate in the form of a relatively wide strip applied fixedly and permanently to one face of a relatively narrow wood-like core with one edge portion of the laminate extending beyond said core face to be free thereof, the method comprising the steps of conditioning the laminate free edge portion for pressure bonding to the core faces to be covered thereby, applying heat to the laminate, confined to its free edge portion in an amount and for a time sufficient for flexibilizing thereof and for rendering such free edge portion amenable to bending, and while so heated and amenable to bending applying to the free edge portion of the laminate a bending force, starting at one end of the laminate strip and moving steadily to the other end thereof, to progressively deflect the free edge portion of the laminate around and upon a proximate face of the core and into close conformity therewith, and, promptly after being so conformed, applying to the laminate strip a pressure force starting at one end thereof and continuing to the other through a prolonged interval, to induce bonding to the core faces of all portions of the laminate in contact therewith, any excess of laminate material then being projected beyond and past one of the faces of the core, trimming off all such excess material evenly with the core face proximate thereto in flush relation therewith, and controlling application of the heat and of the bending and bonding forces so applied to the laminate, as required by the width of the particular core to which the laminate is conformed, to assure a continuous and firm adherence of the laminate strip to the core throughout the area of its faces contacted thereby.

References Cited by the Examiner

UNITED STATES PATENTS

| | | | |
|---|---|---|---|
| 2,804,909 | 9/1957 | Hammer | 156—212 |
| 2,971,874 | 2/1961 | Canno | 156—202 |
| 3,031,356 | 4/1962 | Bousquet et al. | 156—202 |
| 3,066,721 | 12/1962 | Levy | 156—461 |
| 3,067,804 | 12/1962 | Magner | 156—461 |

EARL M. BERGERT, *Primary Examiner.*

W. J. VAN BALEN, *Assistant Examiner.*